(12) United States Patent
Fernández et al.

(10) Patent No.: US 7,669,444 B2
(45) Date of Patent: Mar. 2, 2010

(54) STEERING LOCK ASSEMBLY

(75) Inventors: Juan A. Fernández, Brown Deer, WI (US); Donald J. Balazs, Oconomowoc, WI (US)

(73) Assignee: Huf North America Automotive Parts Mfg. Corp., Milwaukee, WI (US)

( * ) Notice: Subject to any disclaimer, the term of this patent is extended or adjusted under 35 U.S.C. 154(b) by 823 days.

(21) Appl. No.: 11/053,287

(22) Filed: Feb. 8, 2005

(65) Prior Publication Data

US 2005/0178175 A1    Aug. 18, 2005

Related U.S. Application Data

(60) Provisional application No. 60/544,137, filed on Feb. 12, 2004.

(51) Int. Cl.
  *B60R 25/02*    (2006.01)
  *B65D 45/18*    (2006.01)
(52) U.S. Cl. .............................. 70/185; 70/184; 70/252; 220/326
(58) Field of Classification Search ........... 70/181–185, 70/252; 220/324, 326
  See application file for complete search history.

(56) References Cited

U.S. PATENT DOCUMENTS

| | | | |
|---|---|---|---|
| 2,558,852 A | 7/1951 | Jacobi | |
| 3,426,560 A * | 2/1969 | Dwan | 70/252 |
| 3,630,054 A | 12/1971 | Malminen et al. | |
| 3,642,166 A | 2/1972 | Starr | |
| 4,052,869 A * | 10/1977 | Weber | 70/252 |
| 4,074,548 A | 2/1978 | Milton | |
| 4,158,423 A * | 6/1979 | Starr | 220/320 |
| 4,250,976 A * | 2/1981 | Mochida | 70/252 |
| 5,197,312 A * | 3/1993 | Akutsu | 70/247 |
| 5,355,703 A | 10/1994 | Elinski | |
| 5,442,943 A | 8/1995 | Schremmer et al. | |
| 5,704,234 A | 1/1998 | Resch | |
| 5,794,469 A * | 8/1998 | Suzuki | 70/252 |
| 5,848,540 A | 12/1998 | Pieper | |
| 6,201,317 B1 | 3/2001 | Kemmann | |
| 6,236,121 B1 | 5/2001 | Kemmann | |
| 6,401,958 B1 * | 6/2002 | Foss et al. | 220/320 |
| 6,516,640 B2 | 2/2003 | Jacobs | |
| 6,523,382 B1 | 2/2003 | Dimig | |
| 6,526,867 B2 * | 3/2003 | Anderson | 92/98 R |
| 6,571,587 B2 | 6/2003 | Dimig | |
| 6,786,346 B1 * | 9/2004 | Gurnard et al. | 220/320 |

(Continued)

OTHER PUBLICATIONS

PCT International Search Report.

*Primary Examiner*—Peter M Cuomo
*Assistant Examiner*—Christopher Boswell
(74) *Attorney, Agent, or Firm*—Quarles & Brady LLP (57) ABSTRACT

A steering lock assembly that does not require tools for fixing a lock bolt cover relative to a housing to cover a cavity formed in the housing includes a housing having a cavity formed therein with a lock bolt received in the cavity. A lock bolt cover covering the cavity has an opening through which the lock bolt extends. A snap belt is fixed to one of the lock bolt cover and the housing and engages the other of the lock bolt cover and the housing to fix the lock bolt cover relative to the housing. In one embodiment, crush ribs formed on the snap belt minimizes contact between the cover and housing to minimize rattle.

22 Claims, 9 Drawing Sheets

U.S. PATENT DOCUMENTS 6,810,700 B2 * 11/2004 Okuno .................... 70/186
7,086,256 B2 * 8/2006 Hasegawa ................ 70/186
2004/0129042 A1 * 7/2004 Harada et al. ............ 70/252

* cited by examiner

STEERING LOCK ASSEMBLY

CROSS REFERENCES TO RELATED APPLICATIONS

This application claims the priority benefit of U.S. Provisional Patent Application No. 60/544,137 filed on Feb. 12, 2004.

STATEMENT REGARDING FEDERALLY SPONSORED RESEARCH

Not applicable.

BACKGROUND OF THE INVENTION

This invention relates to a steering lock module, and in particular an automotive steering lock assembly having a lock bolt cover.

A steering lock assembly for use in a vehicle typically includes a housing mounted in a vehicle steering column. The steering column houses a steering shaft that upon rotation changes the angular direction of vehicle wheels to steer the vehicle. The steering shaft is selectively locked by a lock bolt reciprocally mounted in a cavity formed in the steering lock assembly housing. The lock bolt is engageable with the steering shaft to prevent rotation of the steering shaft, and thus the ability to steer the vehicle. A lock bolt cover is fixed to the housing over the cavity using screws, bolts, stakes, pins, and the like to fix the cover to the housing.

The lock bolt cover and housing are typically formed from metal which upon loosening of the fastener over time results in the cover and housing cooperatively creating a rattle which is annoying to the end user. In addition, assembly of the steering lock assembly is time consuming because of the use of screws, bolts, stakes, pins, and the like requires tools, such as a screw driver, wrench, and the like, to secure the lock bolt cover to the housing. Accordingly, a need exists for a steering lock assembly which can be easily assembled without the use of tools to secure the lock bolt cover to the housing and minimizes rattle.

SUMMARY OF THE INVENTION

The present invention provides a steering lock assembly that does not require tools for fixing a lock bolt cover relative to a housing to cover a cavity formed in the housing. The assembly includes a housing having a cavity formed therein with a lock bolt received in the cavity. A lock bolt cover covering the cavity has an opening through which the lock bolt extends. A snap belt is fixed to one of the lock bolt cover and the housing and engages the other of the lock bolt cover and the housing to fix the lock bolt cover relative to the housing. In one embodiment, crush ribs formed on the snap belt minimizes contact between the cover and housing to minimize rattle.

A general objective of the present invention is to provide an assembly including a cover that does not require tools for fixing the cover relative to the housing. This objective is accomplished by providing a snap belt fixed to one of the lock bolt cover and the housing and engages the other of the lock bolt cover and the housing to fix the lock bolt cover relative to the housing.

Another objective of the present invention is to minimize rattle caused by contact between the cover and housing. This objective is accomplished by providing crush ribs on the snap belt to minimize contact between the cover and housing.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 6 is a top perspective view of the lock bolt cover of FIG. 1;

Before a preferred embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

As shown in FIGS. 1-16, a steering lock assembly 10 suitable for mounting in a steering column of a vehicle includes a lock bolt 12 that is engageable with a steering shaft. Upon rotation, the steering shaft changes the angular direction of vehicle wheels to steer the vehicle. The lock bolt 12 selectively engages the steering shaft to prevent rotation of the steering shaft, and thus the ability to steer the vehicle. Preferably, a cylinder lock assembly actuable by a key actuates the steering lock assembly 10 to selectively engage the lock bolt 12 with the steering shaft. In the embodiment disclosed herein, an ignition switch 14 forming part of the steering lock assembly 10 is actuated to start the vehicle when the lock bolt 12 is disengaged from the steering shaft.

The steering lock assembly 10 includes an assembly housing 20 having a lock bolt portion 22 extending tangentially from a cylindrical portion 26. The cylindrical portion 26 extends between a cylindrical forward end 28 and a cylindrical rearward end 30. A cam 32 received in the cylindrical portion 26 through the cylindrical forward end 28 engages the lock bolt 12 mounted in the lock bolt portion 22 for reciprocal movement orthogonal to a longitudinal axis 40 of the cylindrical portion 26. A cam pin 34 axially biased by a cam spring 36 extends through the cam 32, and engages the ignition switch 14 mounted to the cylindrical rearward end 30 of the housing 20. An antennae housing 38 mounted to the cylindrical forward end 28 receives the cylinder lock assembly. Preferably, the cylinder lock assembly engages the cam 32 and cam pin 34 to start the vehicle and unlock the steering column.

Referring now to FIGS. 1-5, the housing 20 is preferably formed as a single piece with the lock bolt portion 22 and cylindrical portion 26 formed from a metal, such as a zinc die cast alloy, aluminum, and the like. Although a housing 20 formed as a single piece is preferred, the housing 20 can be formed from, a plurality of portions that are joined together using methods known in the art, such as welding, bolting, bolting, and the like, without departing from the scope of the invention. Moreover, although the present invention is especially suitable for a housing 20 formed from a non-resilient material, such as a metal, the housing 20 can be formed from any material, such as plastic, ceramic, and the like without departing from the scope of the invention.

The lock bolt portion 22 of the housing 20 reciprocally houses the lock bolt 12, and includes a concave upper surface 42 that receives the vehicle steering shaft. The upper surface 42 is joined to a bottom wall 44 by side walls 46 that define a cavity 48. The cavity 48 opens to the upper surface 42, and receives the lock bolt 12 and a lock bolt spring 52. The lock bolt spring 52 is interposed between the lock bolt 12 and lock bolt portion bottom wall 44 to bias the lock bolt 12 into engagement with the steering shaft. A lock bolt cover 60 fixed relative to the housing 20 covers the cavity 48 and limits movement of the lock bolt 12 out of the cavity 48.

The lock bolt cover 60, shown in FIGS. 1-4 and 6-10, is preferably formed from a metal, such as a zinc die cast alloy, aluminum, and the like, and is fixed relative to the housing 20 by a snap belt 70. The cover 60 includes a top plate 62 and a bottom plate 64 joined by sides 66 and ends 68. The sides 66 and ends 68 are spaced inwardly from an outer periphery of the top and bottom plates 62, 64 to define a circumferential groove 72 that receives the snap belt 70. Slots 76 formed in two opposing edges 78 of the bottom plate 64 and the cover sides 66 receive belt guide tabs 80 extending inwardly from the snap belt 70 to properly locate the snap belt 70 relative to the cover 60. In addition, a cover guide tab 84 extending outwardly from an edge of the top plate 62 is received in a slot 86 formed in the housing 20 to properly orient the cover 60 relative to the cavity 48. Although the present invention is especially suitable for a cover 60 formed from a non-resilient material, such as a metal, the cover 60 can be formed from any material, such as plastic, ceramic, and the like without departing from the scope of the invention.

A divider 90 extending from each cover end 68 extends into the groove 72 short of the outer peripheries of the top and bottom plates 62, 64. The divider 90 divides the groove 72 into halves to form pockets 92 in the groove 72 on both sides of the divider 90, and spaces the snap belt 70 from the cover ends 68. The pockets 92 allow the snap belt 70 to deform inwardly as the cover 60 and snap belt 70 are urged into the cavity 48 during assembly.

The lock bolt 12 extends through a rectangular opening 94 formed through the cover 60 to engage the steering shaft. Preferably, the cover top plate 62 includes a concave top surface 96 that is substantially flush with the concave lock bolt portion upper surface 42. A lip 98 extending from the cover top surface 96 surrounds the opening 94. Although a lip 98 is shown, it is not necessary for practicing the invention.

The snap belt 70, shown in FIGS. 1-3 and 12-16, fixes the lock bolt cover 60 relative to the housing 20 using a snap fit to eliminate the need for tools during assembly. Preferably, the snap belt 70 is molded from a plastic material, such as acetal, in the form of an endless rectangular strip having two sides 100 joined by two ends 102. The snap belt 70 is received in the circumferential groove 72 of the lock cover 60, and fits snugly between the cover top and bottom plates 62, 64 surrounding the cover 60. An inner facing surface 108 of the snap belt 70 faces the cover 60, and abuts the cover sides 66 and dividers 90. An outer facing surface 110 of the snap belt 70 faces the housing cavity side walls 46 when assembled. The inner and outer facing surfaces 108, 110 extend between a top edge 112 and a bottom edge 114 of the snap belt 70.

A pair of snap tabs 120 extend from the outer facing surface 110 of each end 102 of the snap belt 70 into openings 124 formed in side walls 46 of the housing cavity 48 to fix the snap belt 70, and thus the cover 60, relative to the housing 20. Although openings 124 formed through the cavity side walls 46 are preferred because this allows the assembly 10 to be disassembled, a shelf or ridge extending into the cavity 48 from the cavity side walls 46 for engagement with the snap tabs 120 can be used without departing from the scope of the invention.

Each snap tab 120 (best shown in FIGS. 15 and 16) is a ramped projection having a lower edge 126, which can be flush with the snap belt outer facing surface 110, proximal the bottom edge 114 of the snap belt 70 and an upper edge 128 proximal the top edge 112 of the snap belt 70. The upper edge 128 extends further from the belt outer facing surface 110 than the lower edge 126 to define an outwardly facing angled camming surface 130.

Figures 13, 14, 15:
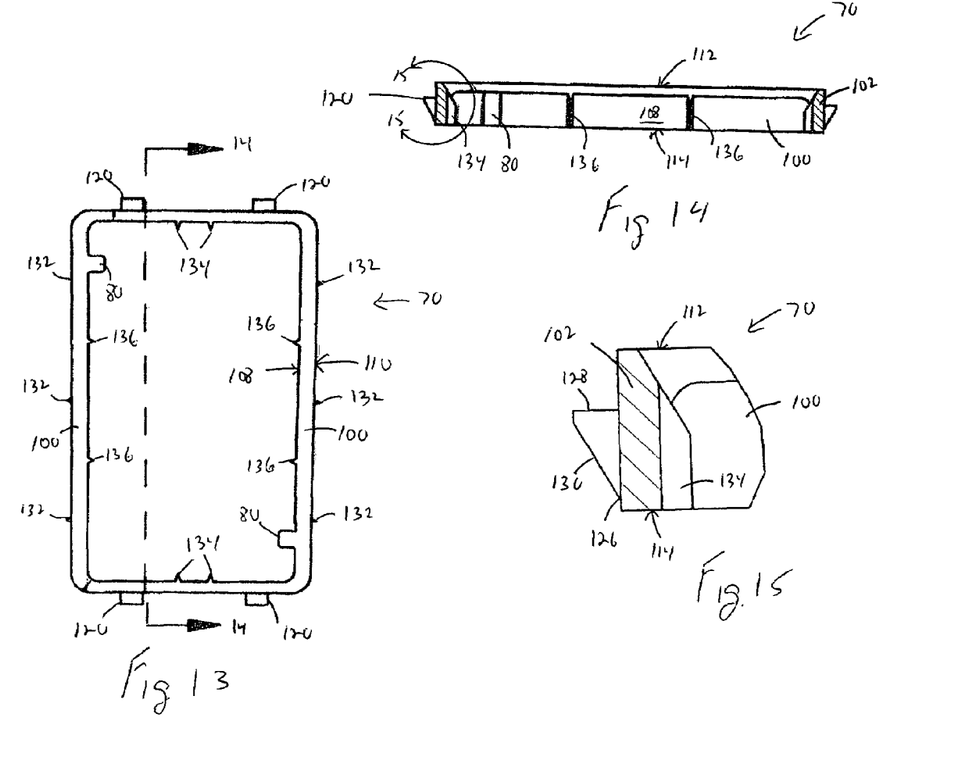
FIG. 13 is a top view of the snap belt of FIG. 12.
FIG. 14 is a sectional view of the snap belt along line 14-14 of FIG. 13.
FIG. 15 is a detailed view of the snap tab of FIG. 14 along line FIG. 15-15 of FIG. 14.
Figure 16:
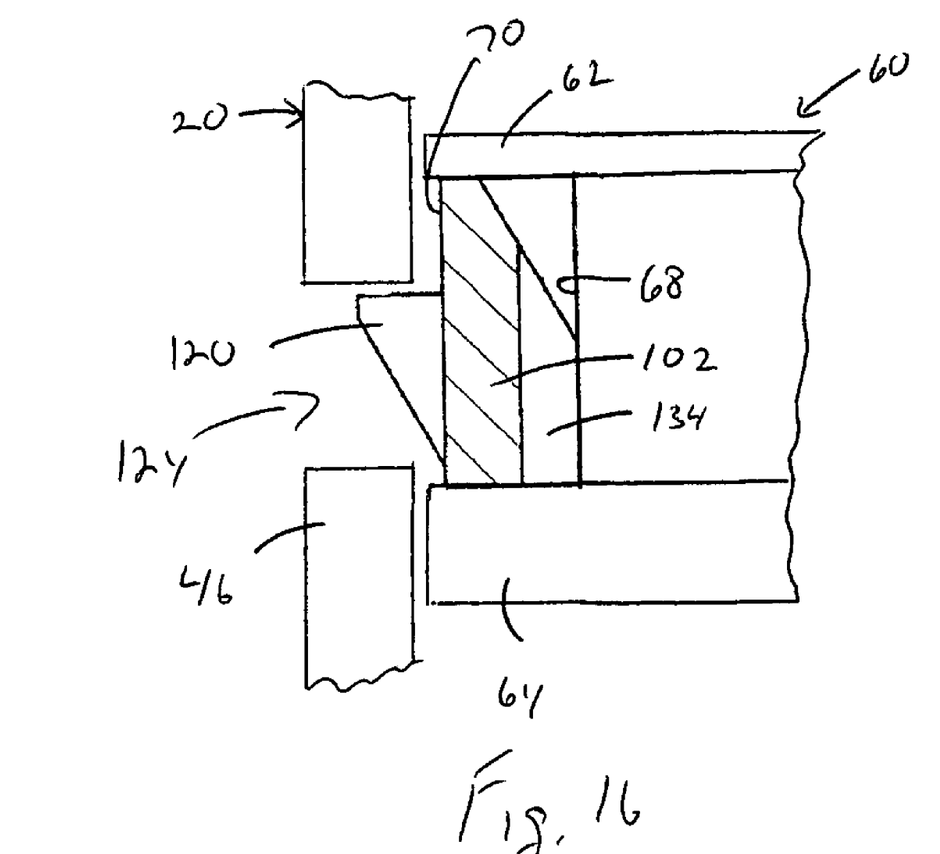
FIG. 16 is as detailed view of the snap tab of FIG. 14 received in an opening formed in the housing of FIG. 1.

The outwardly facing camming surface 130 extends between the lower and upper edges 126, 128, and engages the housing cavity side walls 46 during assembly. During assembly, as the cover 60 and snap belt 70 are urged into the housing cavity 48, the camming surface 130 urges portions of the belt ends 102 toward the cover 60 into a deformed shape in the pockets 92 formed in the groove 72, such that the each snap tab 120 is retracted toward the cover 60. Preferably, top edges of the cavity side walls 46 are chamfered to initially engage the camming surface 130 to allow easy insertion of the cover 60 into the cavity 48.

Once the cover 60 is fully inserted into the housing cavity 48 and the snap tabs 120 are aligned with the openings 124 formed in the housing cavity side walls 46, the snap belt 70 snaps back toward its undeformed shape to urge the snap tabs 120 into the openings 124 and fix the snap belt 70, and thus the cover 60, relative to the housing 20.

Although snap tabs extending from the lock bolt cover is preferred, other structure can be provided to fix the snap belt relative to the housing without departing from the scope of the invention. For example, the snap belt can have a tapered outer facing surface that acts as a camming surface that is urged past an inwardly extending rib formed in the cavity side walls. Once the snap belt is urged past the rib, the top edge of the snap belt engages the rib to fix the snap belt relative to the housing.

Figure 1:
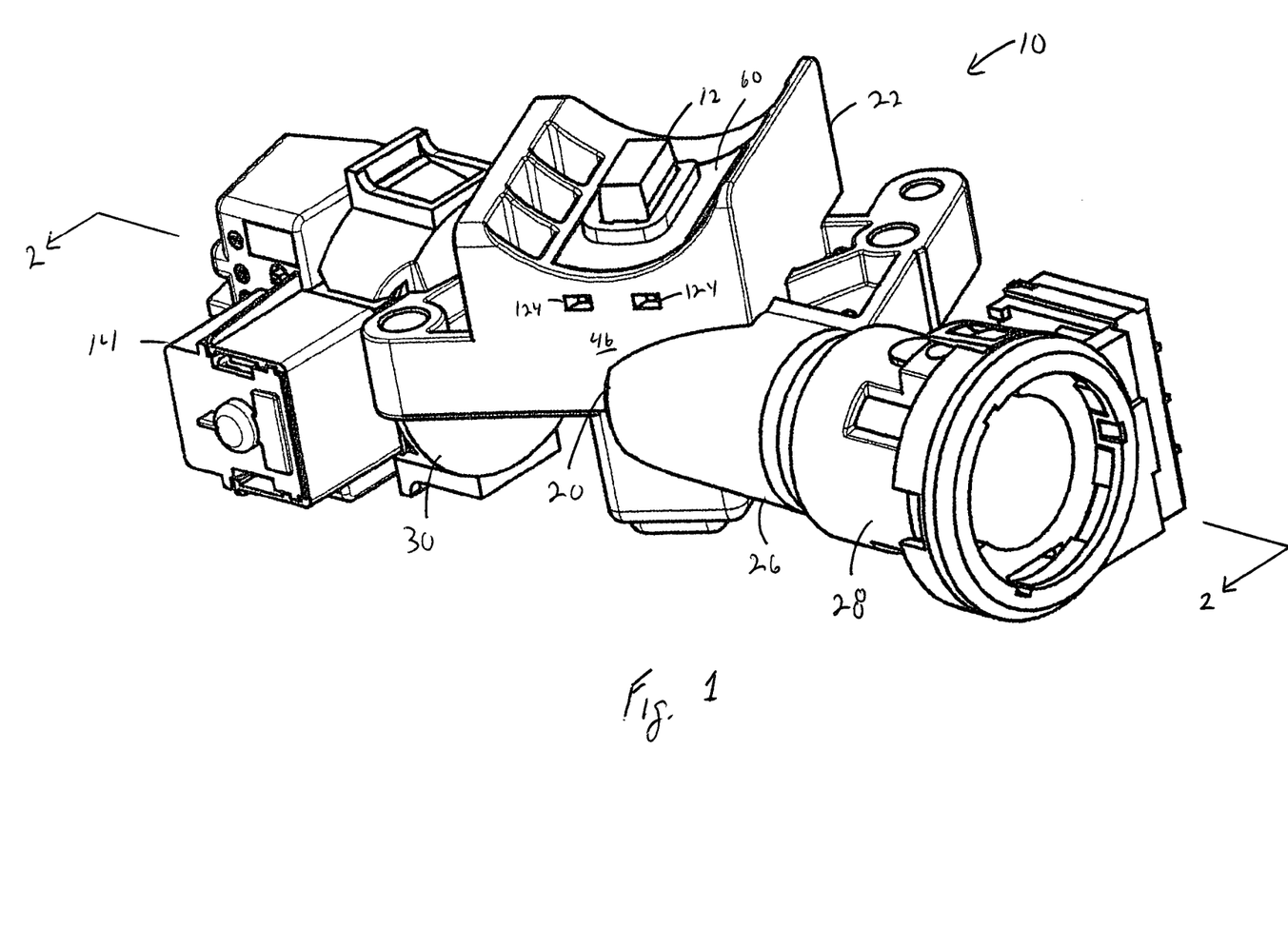
FIG. 1 is a perspective view of a steering lock assembly incorporating the present invention.
Figure 2:
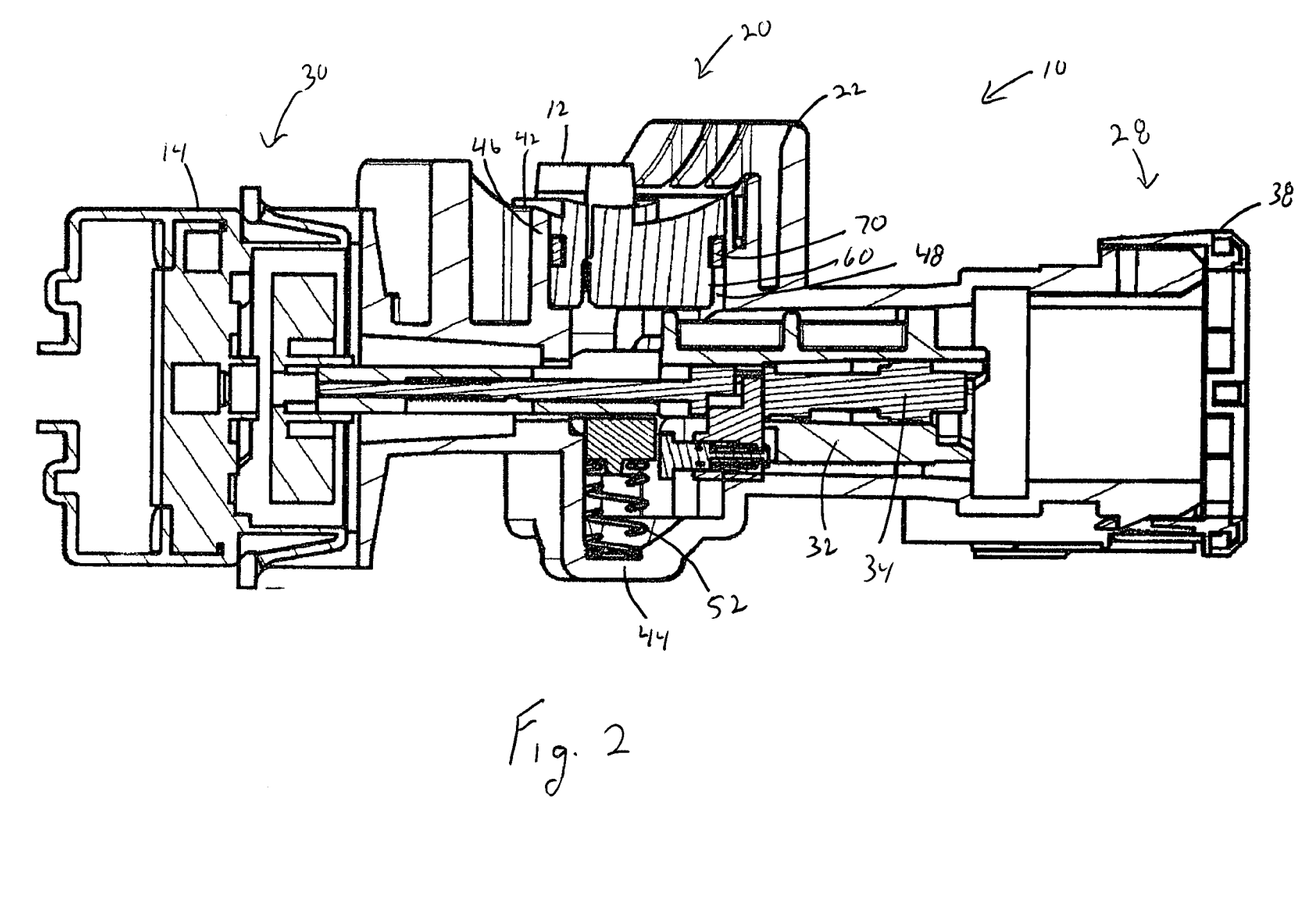
FIG. 2 is a cross sectional view of the steering lock assembly along line 2-2 of FIG. 1.
Figure 3:
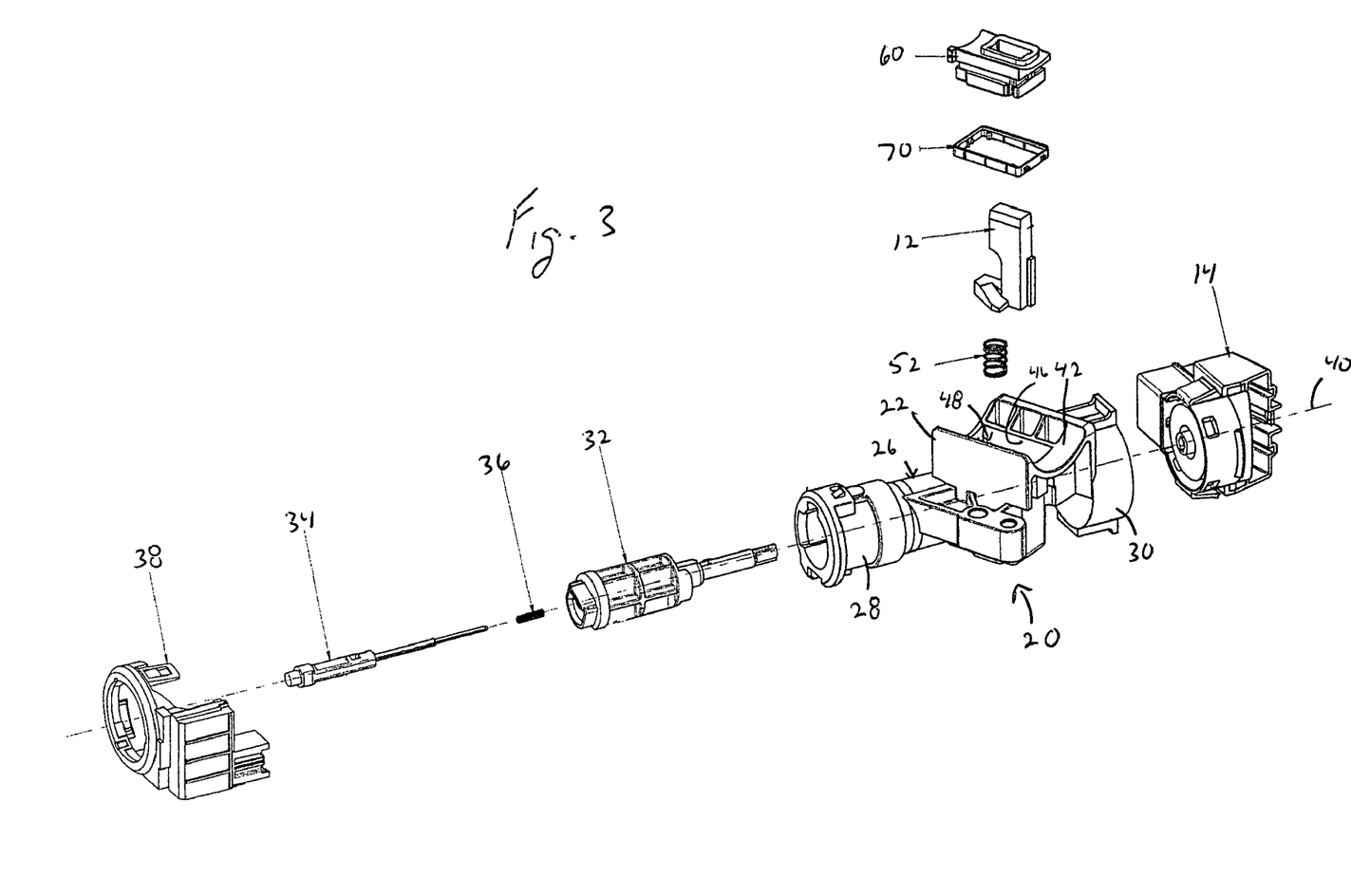
FIG. 3 is a perspective, exploded view of the steering lock assembly of FIG. 1.
Figure 4:
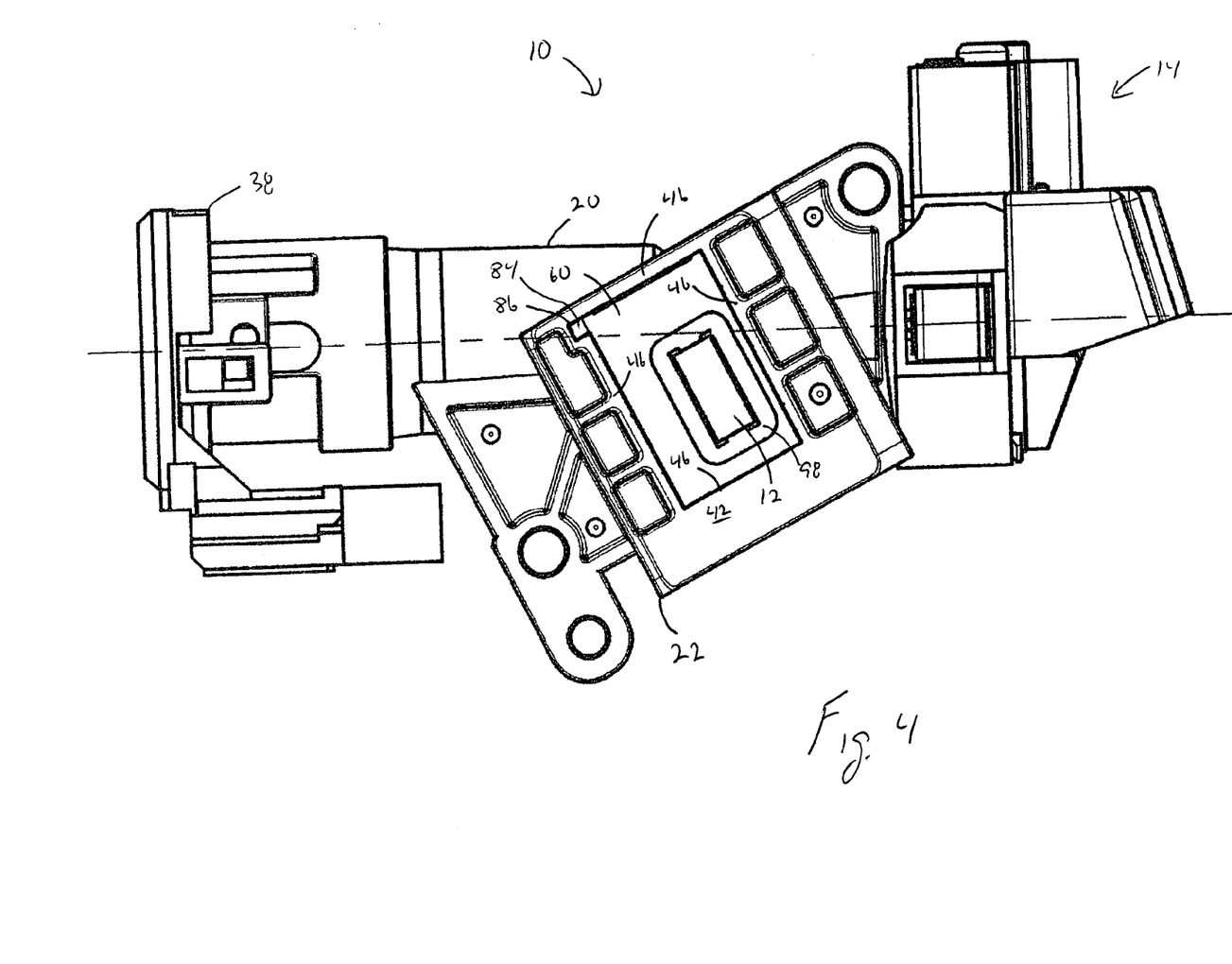
FIG. 4 is a top view of the steering lock assembly of FIG. 1.
Figure 5:
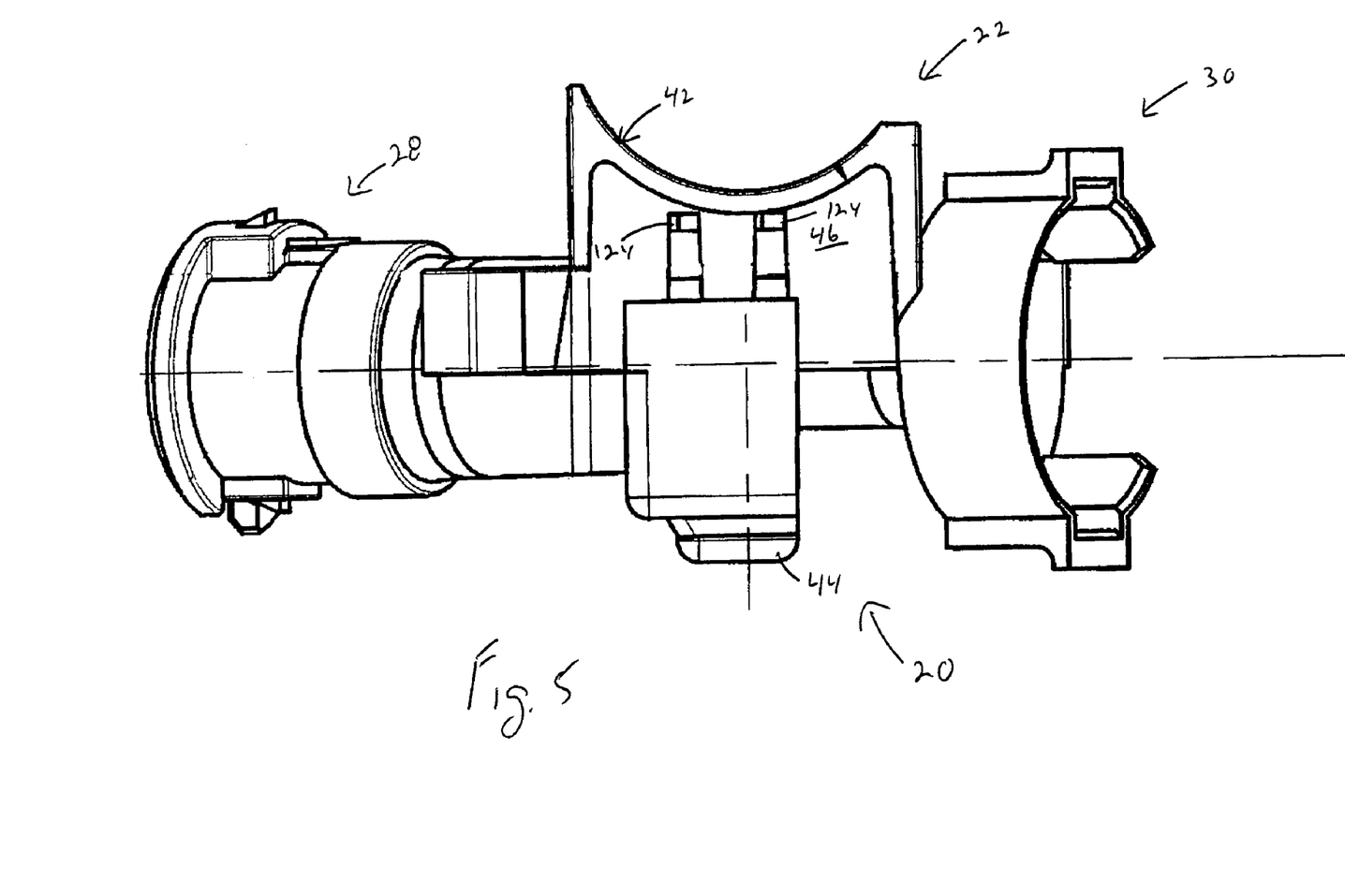
FIG. 5 is an elevational view of the steering lock assembly of FIG. 1.
Figure 7:
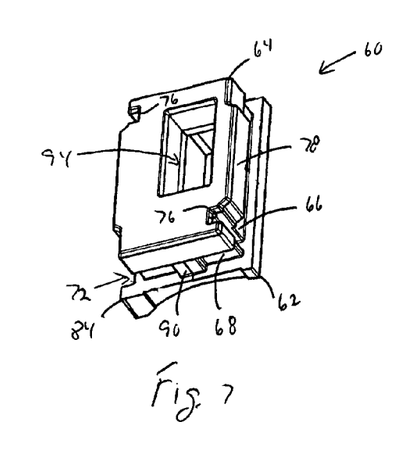
FIG. 7 is a bottom perspective view of the lock bolt cover of FIG. 1.
Figure 8:
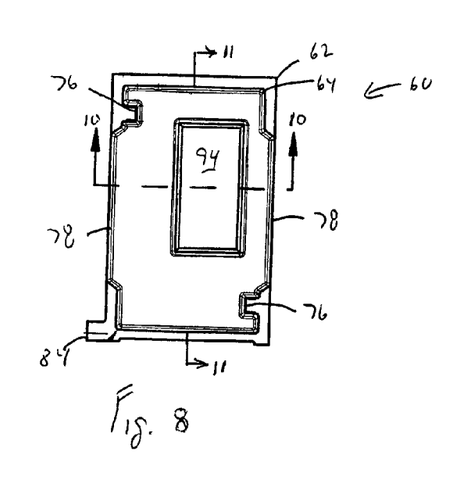
FIG. 8 is a bottom plan view of the lock bolt cover of FIG. 7.
Figure 9:
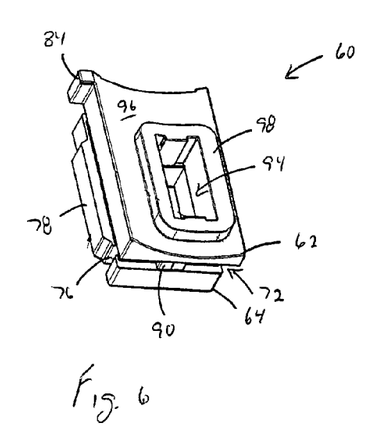
FIG. 9 is an elevational end view of the lock bolt cover of FIG. 7.
Figure 10:
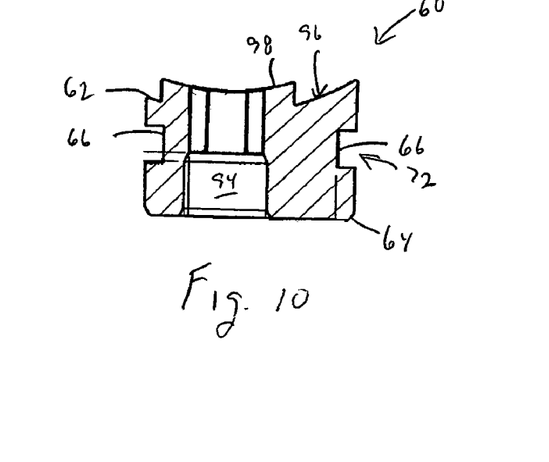
FIG. 10 is a sectional view of the lock bolt cover along line 10-10 of FIG. 8.
Figure 11:
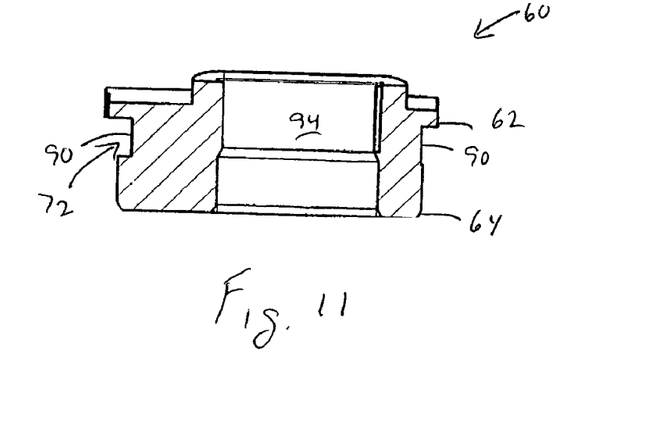
FIG. 11 is a sectional view of the lock bolt cover along line 11-11 of FIG. 8.
Figure 12:
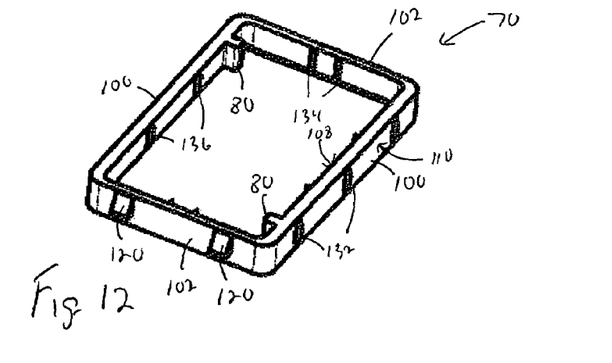
FIG. 12 is a top, perspective view of the snap belt of FIG. 3.

Crush ribs 132, 134, 136 extending from the inner and outer facing surfaces 108, 110 of the snap belt 70 space the snap belt 70 relative to the cover 60 to minimize contact between the cover 60 and the housing 20 that can cause a rattle. In the embodiment disclosed herein, pairs of crush ribs 132, 136 extend inwardly from each of the snap belt sides 100 and ends 102. Snap crush ribs 134 extending inwardly from the inner facing surface 108 of the snap belt ends 102 engage the divider 90 extending into the circumferential groove 72 from the cover. Anti-rattle crush ribs 136 extending inwardly from the inner facing surface 108 of the snap belt sides 100 engage the cover sides 66. In addition, anti-rattle crush ribs 132 extending outwardly from the outer facing surface 110 of the snap belt sides 100 engage the housing cavity side walls 46. Although crush ribs as shown are preferred, any number of crush ribs can be used or they can be omitted without departing from the scope of the invention.

The belt guide tabs 80 extend inwardly from the inner facing surface 108 of each snap belt side 100 proximal each snap belt end 102. Each guide tab 80 is received in one of the slots 76 formed in the bottom plate 64 and sides 66 of the cover 60 to position the snap belt 70 relative to the cover. Preferably, two guide tabs 80 and slots 76 are provided to properly orient the snap belt 70 relative to the cover 60. However, any number of guide tabs and slots can be used in any position without departing from the scope of the invention.

Referring now to FIGS. 1-16, the lock bolt cover 60 is assembled with the housing 20 by first forming a lock bolt cover/snap belt assembly which is received in the housing cavity 48. The lock bolt cover/snap belt assembly is assembled by first aligning, the snap belt guide tabs 80 with the slots 76 formed in the cover bottom plate 64 and sides 66 with the top edge 112 of the belt 70 facing the bottom plate 64. The snap belt 70 is then pressed over the bottom plate 64 until it snaps into the circumferential groove 72 with the snap belt top edge 112 adjacent the cover top plate 62 and the snap belt bottom edge 114 adjacent the bottom plate 64 to form the lock bolt cover/snap belt assembly.

The lock bolt cover/snap belt assembly is then assembled with the housing 20 by first positioning the lock bolt cover/snap belt assembly relative to the housing cavity 48, such that cover bottom plate 64 faces, and is received in, the housing cavity 48 with the cover guide tab 84 aligned with the slot 86 formed in the housing 20 and each snap tab 120 is spaced above one of the openings 124 formed in the cavity side wall 46. The lock bolt cove/snap belt assembly is then pressed into the cavity 48, such that the camming surface 130 of each snap tab 120 engages one of the cavity side walls 46 to deform the snap belt 70 and force portions of the snap belt 70 into the pockets 92 formed in the groove 72. Advantageously, forcing portions of the snap belt 70 into the pockets 92 retracts the snap tabs 120 at least partially into the groove 72. With the snap tabs 120 retracted at least partially into the groove 72, the lock bolt cover/snap belt assembly is easily urged into the cavity 48 without the use of tools.

Once the snap tabs 120 are aligned with the openings 124 in the cavity side wall 46, the snap belt 70 snaps back to its undeformed position forcing the snap tabs 120 into the openings 124 (shown in FIG. 16) to fix the snap belt 70, and thus the cover 60, relative to the housing 20 in the cavity 48. Advantageously, the cover 60 and housing 20 are fixed relative to each other without additional mechanical fasteners, such as screws, bolts, and the like. Moreover, the cover 60 and housing 20 are snapped together without the need for tools to quickly and simplify assemble the parts together. Although additional fasteners are not necessary, they can be used without departing from the scope of the invention.

Although a preferred embodiment of the present invention is a steering lock assembly, any assembly incorporating the present invention is having a housing with an opening covered by a cover. Moreover, although a snap belt received in a circumferential groove formed in the cover and having snap tabs engaging the housing is disclosed, the snap belt can be fixed to the housing, such as by being received in a groove formed in cavity side walls, and have snap tabs engaging the cover to fix the cover relative to the housing without departing from the scope of the invention.

In yet another embodiment of the present invention, the cavity has a closed top and an open bottom. A top wall having a lock bolt opening formed therethrough closes the cavity top with the lock bolt extending through the lock bolt opening for engagement with the steering shaft. A cover, such as cover 60 disclosed above, in combination with a snap belt closes the bottom of the cavity and engages the lock bolt spring to bias the lock bolt toward the top wall, and thus the steering shaft. Of course, a lock bolt cover, such as disclosed above can also be used to cover both the cavity top and bottom if the cavity is open at both ends without departing from the scope of the invention.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

We claim:

1. A steering lock assembly comprising:
    a housing having a cavity formed therein;
    a lock bolt received in said cavity;
    a lock bolt cover covering said cavity;
    a snap belt fixed to one of said lock bolt cover and said housing and engaging the other of said lock bolt cover and said housing to fix said lock bolt cover relative to said housing, said snap belt including a first surface facing said lock bolt cover and a second surface facing said housing; and
    at least one crush rib forming part of said snap belt and extending from one of said first surface and said second surface, said crush rib spacing said snap belt from one of said lock bolt cover and said housing to minimize contact causing a rattle.

2. The steering lock assembly as in claim 1, in which said lock bolt cover has an opening through which said lock bolt extends.

3. The steering lock assembly as in claim 1, in which said cavity includes a bottom wall and open top, wherein said lock bolt cover closes said open top.

4. The steering lock assembly as in claim 1, in which said cover includes a top and bottom joined by sides, and a groove formed in at least one of said sides receives said snap belt to fix said snap belt relative to said cover.

5. The steering lock assembly as in claim 1, in which said snap belt includes at least one snap tab engaging the other of said lock bolt cover and said housing to fix said lock bolt cover relative to said housing.

6. The steering lock assembly as in claim 5, in which said snap tab is an outwardly extending projection having a camming surface that engages the other of said lock bolt cover and said housing to fix said lock bolt cover relative to said housing.

7. The steering lock assembly as in claim 5, in which said cavity includes an internal wall, and at least one opening formed in said internal wall receives said at least one snap tab to fix said cover relative to said housing.

8. The steering lock assembly as in claim 1, in which said snap belt includes at least one crush rib forming part of said snap belt and extending from the other of said first surface and said second surface to minimize rattle caused by contact between said housing and said cover.

9. The steering lock assembly as in claim 1, in which said housing and said cover are formed from a metal and said belt is formed from a plastic.

10. The steering lock assembly as in claim 1, in which said cover includes a circumferential groove, and said snap belt is received in said circumferential groove to fix said snap belt relative to said cover.

11. The steering lock assembly as in claim 10, in which a divider extending from said cover into said groove spaces at least a portion of said snap belt from said groove to form a pocket in said groove for receiving at least a portion of said snap belt during assembly of said belt with said cover.

12. An assembly comprising:
a housing having a cavity formed therein;
a cover covering said cavity;
a snap belt fixed relative to said cover, said snap belt including a first surface facing said cover and a second surface facing said housing;
at least one snap tab forming part of said snap belt and engaging said housing and fixing said cover relative to said housing;
in which said at least one snap tab forms an integral part of said snap belt engaging said housing to fix said cover relative to said housing and in which said cavity includes an internal wall, and at least one opening formed in said internal wall receives said at least one snap tab to fix said cover relative to said housing.

13. The assembly as in claim 12, in which said cover includes a top and bottom joined by sides, and a groove formed in at least one of said sides receives said snap belt to fix said snap belt relative to said cover.

14. The assembly as in claim 12, in which said housing and said cover are formed from a metal and said belt is formed from a plastic.

15. The assembly as in claim 12, in which said cover includes a circumferential groove, and said snap belt is received in said circumferential groove to fix said snap belt relative to said cover.

16. The assembly as in claim 15, in which a divider extending from said cover into said groove spaces at least a portion of said snap belt from said groove to form a pocket in said groove for receiving at least a portion of said snap belt upon assembly of said belt with said cover.

17. The assembly as in claim 12, in which a lock bolt is received in said cavity and extends through an opening formed in said cover.

18. The steering lock assembly as in claim 12, in which said cavity includes a bottom wall and open top, wherein said cover closes said open top.

19. An assembly comprising:
a housing having a cavity formed therein;
a cover covering said cavity;
a snap belt fixed relative to one of said cover and said housing, said snap belt including a first surface facing said cover and a second surface facing said housing;
at least one snap tab forming part of said snap belt and engaging the other of said cover and said housing and fixing said cover relative to said housing; and
in which said snap belt includes at least one crush rib forming part of said snap belt and extending from one of said first surface and said second surface to minimize rattle caused by contact between said housing and said cover.

20. The lock assembly as in claim 19, in which said at least one snap tab forms an integral part of said snap belt engaging the other of said cover and said housing to fix said cover relative to said housing.

21. The assembly as in claim 20, in which said snap tab is an outwardly extending projection having a camming surface that engages the other of said cover and said housing to fix said lock bolt cover relative to said housing.

22. A method of covering a cavity formed in a housing, said method including:
fixing a snap belt to one of a cover and a housing, said snap belt including a first surface facing said cover and a second surface facing said housing with at least one snap tab forming part of said snap belt and extending from one of said first surface and said second surface;
urging said cover into said cavity; and
engaging said snap tab with the other of said cover and said housing to fix said cover relative to said housing, with said snap tab fixing said cover relative to said housing.

* * * * *